United States Patent
Mizutani

(10) Patent No.: US 9,983,809 B2
(45) Date of Patent: May 29, 2018

(54) DATA-REFRESH APPARATUS

(71) Applicant: DENSO CORPORATION, Kariya, Aichi-pref. (JP)

(72) Inventor: Hiroaki Mizutani, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 228 days.

(21) Appl. No.: 15/032,267

(22) PCT Filed: Oct. 9, 2014

(86) PCT No.: PCT/JP2014/005137
§ 371 (c)(1),
(2) Date: Apr. 26, 2016

(87) PCT Pub. No.: WO2015/064021
PCT Pub. Date: May 7, 2015

(65) Prior Publication Data
US 2016/0253113 A1    Sep. 1, 2016

(30) Foreign Application Priority Data

Oct. 29, 2013 (JP) .................................. 2013-224313

(51) Int. Cl.
*G06F 3/06* (2006.01)
*G06F 11/10* (2006.01)
*G01C 21/26* (2006.01)

(52) U.S. Cl.
CPC .......... *G06F 3/0619* (2013.01); *G01C 21/26* (2013.01); *G06F 3/0632* (2013.01);
(Continued)

(58) Field of Classification Search
None
See application file for complete search history.

(56) References Cited

U.S. PATENT DOCUMENTS 5,732,092 A    3/1998   Shinohara
7,596,738 B2*  9/2009   Chessin .............. G06F 11/1024
                                              365/200
(Continued)

FOREIGN PATENT DOCUMENTS

EP        404940 A1       1/1991
JP        H01277949 A    11/1989
(Continued)

*Primary Examiner* — Mujtaba M Chaudry
(74) *Attorney, Agent, or Firm* — Harness, Dickey & Pierce, P.L.C.

(57) ABSTRACT

A data-refresh apparatus performs a refresh control on a storage device being included in an onboard apparatus and including a NAND-type flash memory. The refresh control detects an error of all data and corrects a detected error. The data-refresh apparatus comprises a first refresh portion; and a second refresh portion that performs the refresh control when the onboard apparatus is installed to a vehicle and the vehicle subsequently becomes a predetermined service state. The storage device is written with data and subsequently soldered to a circuit board in manufacturing of the onboard apparatus. The second refresh portion includes a travel determination portion that determines whether the vehicle remains a travel state. The second refresh portion performs the refresh control while assuming that the vehicle becomes the predetermined service state, when the travel determination portion determines that the vehicle remains the travel state.

4 Claims, 2 Drawing Sheets

(52) U.S. Cl.
CPC .......... *G06F 3/0679* (2013.01); *G06F 11/106* (2013.01); *G06F 11/1044* (2013.01)

(56) References Cited

U.S. PATENT DOCUMENTS

| | | | | |
|---|---|---|---|---|
| 2005/0052770 A1* | 3/2005 | Osafune | ................... | G11B 5/09 360/51 |
| 2005/0083726 A1* | 4/2005 | Auclair | ................... | G11C 16/10 365/154 |
| 2005/0219904 A1* | 10/2005 | Sakurai | ................ | G11C 16/225 365/185.18 |
| 2008/0043527 A1* | 2/2008 | Aritome | ................... | G11C 5/04 365/185.03 |
| 2012/0033519 A1 | 2/2012 | Confalonieri et al. | | |
| 2014/0192583 A1* | 7/2014 | Rajan | ...................... | G11C 7/10 365/63 |

FOREIGN PATENT DOCUMENTS

| | | |
|---|---|---|
| JP | H09204367 A | 8/1997 |
| JP | 2002195094 A | 7/2002 |
| JP | 2012514265 A | 6/2012 |
| JP | 2012238259 A | 12/2012 |
| JP | 2013179808 A | 9/2013 |

* cited by examiner

DATA-REFRESH APPARATUS

CROSS REFERENCE TO RELATED APPLICATIONS

This application is a U.S. National Phase Application under 35 U.S.C. 371 of International Application No. PCT/JP2014/005137 filed on Oct. 9, 2014 and published in Japanese as WO 2015/064021 A1 on May 7, 2015. This application is based on and claims the benefit of priority from Japanese Patent Application No. 2013-224313 filed on Oct. 29, 2013. The entire disclosures of all of the above applications are incorporated herein by reference.

TECHNICAL FIELD

The present disclosure relates to a data-refresh apparatus to provide a refresh control for a storage device that includes a NAND-type flash memory and is included in an onboard apparatus.

BACKGROUND ART

The NAND-type flash memory saves data by storing an electric charge in a floating gate of a cell. The electric charge stored in the floating gate of each cell in the NAND-type flash memory is lost as time proceeds, causing a data error. In the present description, a time elapsed until a data error occurs due to the loss of the electric charge is referred to as data retention time.

In order to correct an error due to a lapse of the data retention time, a storage device including the NAND-type flash memory detects an error and performs a refresh control to correct the error (for example, Patent literature 1).

PRIOR ART LITERATURES

Patent Literature

Patent Literature 1: JP 2012-238259 A

The inventor of the present application has found the following regarding a storage device.

The storage device including the NAND-type flash memory is used for onboard apparatus such as in-vehicle navigation systems. The data retention time of the NAND-type flash memory is dependent on temperature. Increasing the temperature shortens the data retention time. The onboard apparatus is often exposed to the temperature of approximately 80° C. The storage device included in the onboard apparatus indicates a shorter data retention time than a storage device used at room temperature (approximately 30° C.). The storage device used for the onboard apparatus indicates a higher error rate than the storage device used at room temperature.

In order to ensure intensity and simplify an installation process, data is written to a storage device, and then the storage device is soldered to a circuit substrate. The storage device is exposed to the temperature of approximately 250° C. during a soldering process (a reflow process) and therefore further shortens the data retention time. The soldering process drastically increases the error rate.

A manufacturing process of an onboard apparatus may include the refresh control after the soldering process in order to restrain an increase in the error rate due to the soldering process. However, the refresh control, when performed, requires a long time in order to read all data from the flash memory, detect and correct an error in data related to the read, and write the data whose error was detected and corrected. In the manufacturing process, performing the refresh control after the soldering process may lengthen the time required for the manufacturing process.

SUMMARY OF INVENTION

It is an object of the present disclosure to provide a data-refresh apparatus that performs a refresh control on a NAND-type flash memory while retraining a manufacturing process from being lengthened.

A data-refresh apparatus according to one aspect of the disclosure performs a refresh control on a storage device being included in an onboard apparatus and including a NAND-type flash memory. The refresh control detects an error of all data stored in the flash memory and corrects a detected error. The data-refresh apparatus comprises a first refresh portion that performs the refresh control when a predetermined period elapses, and a second refresh portion that performs the refresh control when the onboard apparatus is installed to a vehicle and the vehicle subsequently becomes a predetermined service state. Data is written and the storage device is subsequently soldered to a circuit board, during a manufacturing process of the onboard apparatus.

An error may occur in the NAND-type flash memory possibly since the error rate increases over time or since the error rate increases after soldering the storage device to the circuit board. In order to restrain an increase in the error rate over time, a first refresh portion performs the refresh control. In order to restrain an increase in the error rate due to soldering the NAND-type flash memory, a second refresh portion performs the refresh control.

It is supposed that the vehicle is serviceable after the onboard apparatus is built in the vehicle. In this case, the power supply unit of the vehicle has started continuously supplying the power to the onboard apparatus. When the vehicle is serviceable, it may be easy to ensure a time required for the refresh control that detects and corrects an error on all data stored in the NAND-type flash memory, even when the refresh control may take long time. It may be possible that the second refresh portion performs the refresh control without providing the manufacturing process with a special working process for the refresh control. In this case, the refresh control after soldering the storage device to the circuit board may be performed after the vehicle starts to be in service. It may be possible to prevent the refresh control from prolonging the manufacturing process. It may be possible to perform the refresh control favorably while restraining the manufacturing process of the onboard apparatus from being prolonged.

BRIEF DESCRIPTION OF DRAWINGS

The above and other aspects, features and advantages of the present disclosure will become more apparent from the following detailed description made with reference to the accompanying drawings. In the drawings.

EMBODIMENTS FOR CARRYING OUT INVENTION

Figure 1:
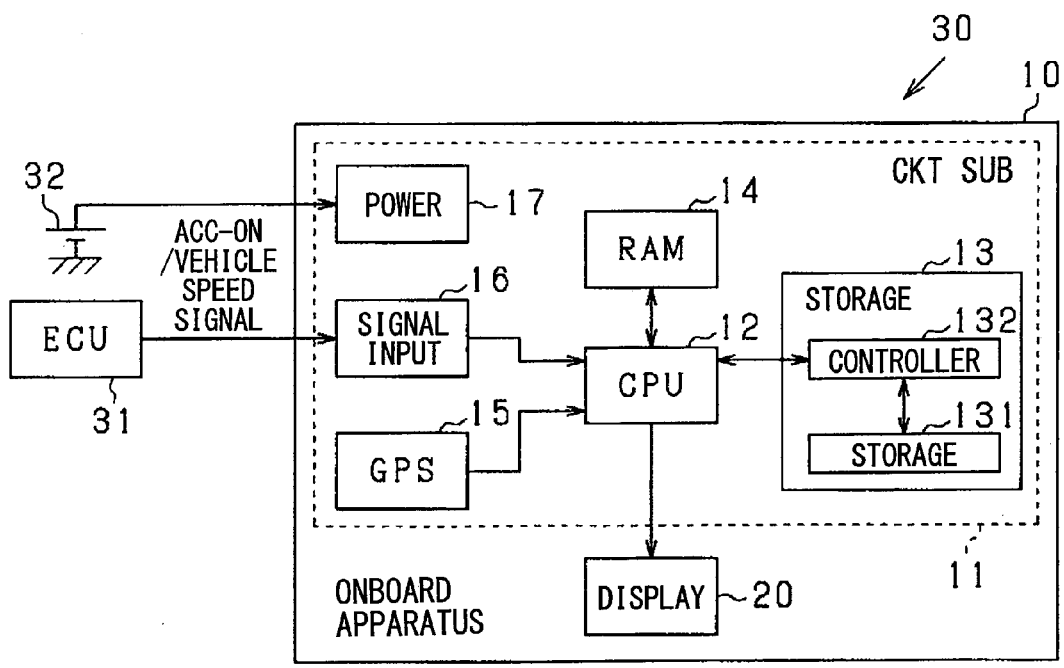
FIG. 1 is a diagram illustrates a configuration of an onboard apparatus.

FIG. 1 illustrates a configuration of an onboard apparatus 10 according to the present embodiment. The onboard apparatus 10 represents an in-vehicle navigation system and is mounted on a vehicle 30 for use.

The onboard apparatus 10 includes a CPU 12, a storage device 13, a RAM (a random access memory) 14, a GPS (global positioning system) element 15, a signal input portion 16, and a power supply portion 17. These components are mounted to a circuit board 11. The onboard apparatus 10 includes a display 20. The CPU 12 corresponds to a data-refresh apparatus according to the present disclosure. The onboard apparatus 10 may be referred to as an in-vehicle apparatus.

The GPS element 15 receives a GPS signal transmitted from a GPS satellite to calculate a terrestrial position of the onboard apparatus 10 and the vehicle 30 mounted with the onboard apparatus 10. The GPS element 15 notifies the CPU 12 of the calculated position as a positioning signal.

The signal input portion 16 is connected to an ECU (Electronic Control Unit) 31 provided for the vehicle 30. The ECU 31 supplies the CPU 12 with an ACC-ON signal and a vehicle speed signal through the signal input portion 16. The ACC-ON signal indicates that the power is supplied to the onboard apparatus 10. The vehicle speed signal indicates a travelling speed of the vehicle 30.

The CPU 12 is provided by an general microprocessor. The CPU 12 reads a program data and a map data that are stored in the storage device 13. The CPU 12 performs a program on the RAM 14. The onboard apparatus 10 operates as an in-vehicle navigation system. When the CPU 12 executes the program data, the CPU 12 uses the positioning signal supplied from the GPS element 15 and the vehicle speed signal supplied from the signal input portion 16.

The power supply portion 17 is supplied with the power when connected to a power supply unit 32 of the vehicle 30. The power supply portion 17 applies voltage conversion with respect to the supplied power, and supplies the power to the display 20 and the elements 12-15 mounted to the circuit board 11. The illustration in the drawings omits connection between the power supply portion 17 and each of the elements 12-15 and the display 20.

The present embodiment uses an e•MMC (embedded MultiMediaCard) (registered trademark) device as the storage device 13. The e•MMC (also referred to as e.MMC) device includes a storage portion 131 and a controller 132. The storage portion 131 includes a NAND-type flash memory. The controller 132 provides a write control and a read control over the storage portion 131. The storage portion 131 corresponds to the NAND-type flash memory according to the present disclosure.

The storage portion 131 stores an operational program data and a map data that are used for the onboard apparatus 10 to operate as an in-vehicle navigation system. Data stored in the storage portion 131 contains actual data and a redundant bit for error correction. The controller 132 includes an ECC (Error Check and Correction) function that detects and corrects an error based on the redundant bit for error correction.

The controller 132 performs the read control and the write control of data over the storage portion 131 in accordance with an MMC (MultiMedia Card) format command issued from the CPU 12. The controller 132 reads data in accordance with a data read command from the CPU. In this case, the controller 132 uses the ECC function to detect and correct an error in the data to be read.

The storage device 13 is contained in a BGA (Ball Grid Array) package. After data is written to the storage device 13, a reflow process fastens the storage device 13 to the circuit board 11 included in the onboard apparatus 10. Specifically, the reflow process uses a chip mounter to mount the storage device 13 to the circuit board 11. The reflow process preheats the circuit board 11 and the storage device 13 in a reflow furnace (approximately two minutes, and approximately 150° C.). The reflow furnace is heated to a high temperature to melt the solder of the BGA package containing the storage device 13 and fasten the storage device 13 to the circuit board 11 (approximately one minute, and approximately 250° C.).

The NAND-type flash memory is written with data by injecting an electric charge into the floating gate insulated by an insulation layer. The electric charge injected into the floating gate is lost due to a tunnel effect as time elapses. An error occurs in data when the amount of the lost electric charge exceeds a predetermined amount. This error can occur in all data stored in the storage portion 131.

When data is read from the storage portion 131, the controller 132 uses the ECC function to detect and correct an error in only data to be read. The ECC function detects and corrects the error of the data to a read target. The error detection and the error correction are not performed on all data stored in the storage portion 131 at a time. Thus, the controller 132 can restrain occurrence of an error in data that is read frequently. However, the controller 132 may not restrain occurrence of an error in data that is read less frequently.

The CPU 12 as the data-refresh apparatus according to the embodiment performs the refresh control that detects and corrects an error in all data stored in the storage portion 131. During the refresh control, the CPU 12 reads data from the storage portion 131 to the RAM 14. While data is read, the controller 132 uses the ECC function to detect and correct an error in each of data to be read. The RAM 14 temporarily stores the data whose error is detected and corrected. The CPU 12 writes the data in the RAM 14 back to the storage device 13. The CPU 12 reads data, detects and corrects an error in data, and writes back data as to all data written in the storage portion 131.

The embodiment performs a first refresh process and a second refresh process that differ from each other in conditions to perform the refresh control. Hereinafter, the first refresh process and the second refresh process will be described. Incidentally, the storage portion 131 stores the program data for performing the first refresh process and the second refresh process. The CPU 12 reads the program data onto the RAM 14 to perform the program data.

The first refresh process performs the refresh control each time execution cycle X elapses. The amount of electric charge lost from the floating gate of the NAND-type flash memory increases as the temperature of the NAND-type flash memory increases. Increasing the temperature of the storage device 13 increases the error rate of data stored in the storage portion 131. The data error rate increases on the storage device 13 used for the onboard apparatus 10 operating under in-vehicle environment (up to approximately 80° C.) compared to a storage device 13 used for a unit operating at room temperature (up to approximately 30° C.). The first refresh process performs the refresh control on the storage device 13 under the condition that execution cycle X elapses in accordance with the in-vehicle environment. Specifically, the CPU 12 contains a timer T that indicates the time elapsed from the most recently performed refresh control (a previous refresh control). The CPU 12 determines an elapse of the execution cycle X according to the refresh control based on a value of the timer T.

The second refresh process performs the refresh control under a condition that the onboard apparatus 10 is built in the vehicle 30 and the power supply unit 32 of the vehicle 30 starts continuously supplying the power. During the reflow process, the storage device 13 is exposed to a high temperature (up to 250° C.). Data has been already written to the storage device 13 before the reflow process. Performing the reflow process remarkably increases the error rate in the already written data. The second refresh process performs the refresh control on the storage device 13 under the condition that the onboard apparatus 10 is shipped as a product after the reflow process and is built in the vehicle 30 and that the power supply unit 32 of the vehicle 30 starts continuously supplying the power. Specifically, the refresh control is performed when the vehicle 30 is determined to be a travel state.

Figure 2:
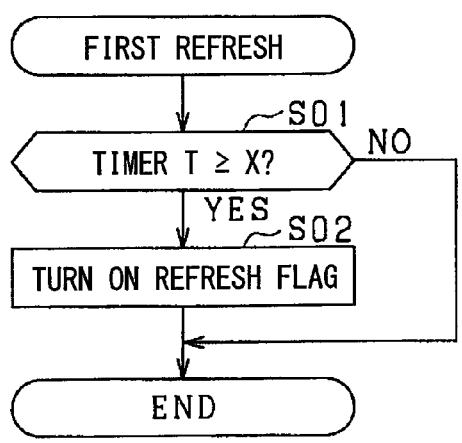
FIG. 2 is a flowchart illustrating a first refresh process.

The first refresh process will be described with reference to a flowchart in FIG. 2. The CPU 12 performs this process at a predetermined cycle.

At step S01, the CPU 12 determines whether the timer T is larger than or equal to execution cycle X. The timer T indicates the time elapsed from the most recently performed refresh control. The execution cycle X (for example, one year) is applied to the refresh control based on the first refresh process. An initial value of the timer T is set to 0. When the timer T is larger than or equal to X (S01: YES), the CPU 12 proceeds to step S02, turns on a refresh flag to perform the refresh control, and terminates the process. When the timer T is smaller than X (S01: NO), the CPU 12 terminates the process.

Figure 3:
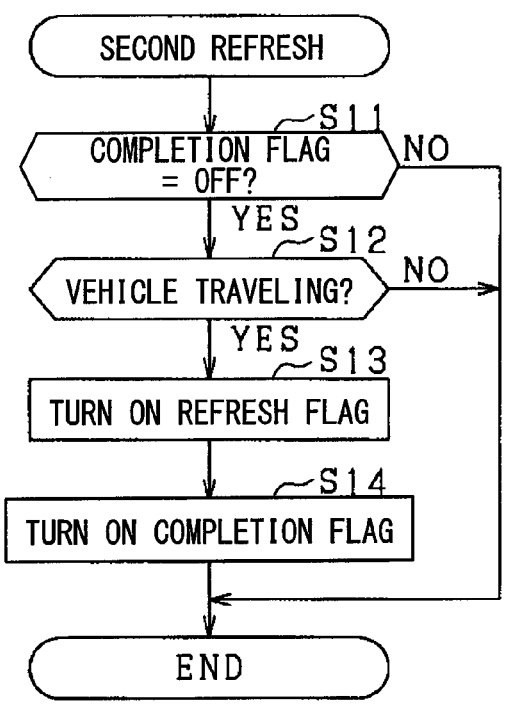
FIG. 3 is a flowchart illustrating a second refresh process.

The second refresh process will be described with reference to a flowchart in FIG. 3. The CPU 12 performs this process at a predetermined cycle.

At step S11, the CPU 12 determines whether a completion flag is turned on. The completion flag indicates that the second refresh process already turns on the refresh flag. The completion flag is initially set to off. When the completion flag is determined to be on (S11: NO), the CPU 12 terminates the process since the second refresh process already turns on the refresh flag.

When the completion flag is determined to be off (S11: YES), the CPU 12 proceeds to step S12 and determines whether the vehicle 30 remains a travel state, based on a positioning signal supplied to the CPU 12 from the GPS element 15. When the vehicle 30 is determined not to be the travel state (S12: NO), the CPU 12 terminates the process. When the vehicle 30 is determined to remain a travel state (S12: YES), the CPU 12 proceeds to step S13 and turns on the refresh flag to perform the refresh control. At step S14, the CPU 12 turns on the completion flag and terminates the process.

The CPU 12 performs the refresh control when determining that the vehicle 30 remains the travel state. In this case, the CPU 12 determines that the onboard apparatus 10 is mounted to the vehicle 30 and that the power supply unit 32 of the vehicle 30 starts continuously supplying the power to the onboard apparatus 10. The first refresh portion performs the refresh control each time execution cycle X elapses. The second refresh portion performs the refresh control only once.

Figure 4:
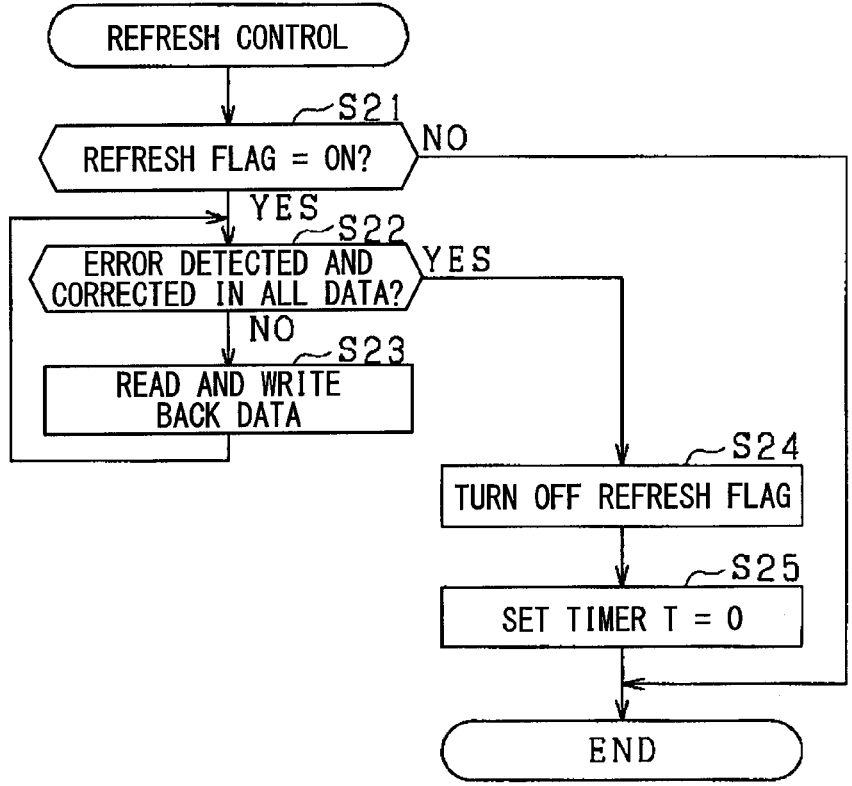
FIG. 4 is a flowchart illustrating a refresh control process.

FIG. 4 is a flowchart illustrating a refresh control process. The CPU 12 cyclically performs a program related to the process when the power is supplied to the onboard apparatus 10.

At step S21, the CPU 12 determines whether the refresh flag turns on. When the refresh flag is determined to be off (S21: NO), the CPU 12 terminates the process. When the refresh flag is determined to be on (S21: YES), the CPU 12 proceeds to step S22 and determines whether the error detection and the error correction are completed on all data stored in the storage device 13.

When there is a data in which neither error detection nor error correction is not performed (S22: NO), the CPU 12 proceeds to step S23 and reads data subject to neither error detection nor error correction from the storage device 13 to the RAM 14. During the read operation, the function of the controller 132 performs the error detection and the error correction on the data to be read. After the error detection and the error correction are applied to the data, the CPU 12 writes the data back to the storage device 13 from the RAM 14. The CPU 12 reads and writes back data at step S23 until the error detection and the error correction are completed on all data stored in the storage device 13.

When the error detection and the error correction are determined to be complete on all data stored in the storage device 13 (S22: YES), the CPU 12 proceeds to step S24 and sets the refresh flag to off. At step S25, the CPU 12 initializes the value of the timer T to 0 and terminates the process.

According to the refresh process, when the refresh flag turns on, the refresh control process starts the error detection and the error correction on each data stored in the storage device 13. When the refresh flag turns on, the refresh control process performs the error detection and the error correction until the error detection and the error correction are complete on all data. It is supposed that the power supply to the onboard apparatus 10 stops and then restarts while the refresh flag remains on. In this case, the refresh control process continuously performs the error detection and the error correction from the state before the power supply stops.

An error may occurs in a NAND-type flash memory (the storage portion 131) since the error rate increases over time or since the error rate increases after soldering the storage device 13 to the circuit board 11. In order to restrain an increase in the error rate over time, the first refresh process performs the refresh control. In order to restrain an increase in the error rate due to soldering, the second refresh process performs the refresh control.

It is supposed that that the vehicle 30 is serviceable after the onboard apparatus 10 is built in the vehicle 30. In this case, the power supply unit 32 of the vehicle 30 can be assumed to start continuously supplying the power to the onboard apparatus 10. When the vehicle 30 is serviceable, it may be easy to ensure the time required for the refresh control that detects and corrects an error on all data stored in the storage portion 131 even when the time required for the refresh control may take long time. It may be possible to perform the refresh control without providing the manufacturing process with a special working process for the refresh control. In this case, the refresh control after soldering the storage device 13 to the circuit board 11 may be performed after the vehicle 30 starts to be in service. It may be possible to prevent the refresh control from prolonging the manufacturing process. It may be possible to favorably perform the refresh control while restraining the manufacturing process of the onboard apparatus 10 from being prolonged.

When the refresh flag is on, the error detection and the error correction are performed on the remaining data until the error detection and the error correction are completed on all data stored in the storage portion 131 within a period during which the power is supplied to the onboard apparatus 10. The refresh flag is turned off when the error detection and the error correction are completed on all the data. It may be possible to determine whether the error detection and the error correction are performed on all the data by performing the refresh control using the refresh flag. It may be possible to reliably perform the error detection and the error correction on all data by a single-time refresh control.

When the vehicle 30 remains the travel state, it is supposed that the onboard apparatus 10 is mounted to the vehicle 30 and the power supply unit 32 of the vehicle 30 starts continuously supplying the power to the onboard apparatus 10. It may be possible to perform the refresh control at a favorable timing by determining whether the vehicle 30 remains the travel state, and by performing the refresh control when the vehicle 30 is determined to remain a travel state.

Specifically, when the onboard apparatus 10 is provided as an in-vehicle navigation system, it may be possible to determine whether the vehicle 30 remains the travel state, based on a vehicle position computed by the in-vehicle navigation system.

OTHER EMBODIMENTS

The above embodiment assumes the onboard apparatus 10 to be the in-vehicle navigation system, but this may be changed. Specifically, the GPS element 15 may be eliminated from the configuration illustrated in FIG. 1 to configure an onboard apparatus 10a (not shown). In this case, at step S12 of the second refresh process in FIG. 3, the CPU 12 determines whether the vehicle remains the travel state, based on the vehicle speed signal. It is supposed that the onboard apparatus 10a receives the vehicle speed signal, the onboard apparatus 10a which does not include the GPS element 15. In this case, it may be possible for the CPU 12 to determine whether the vehicle 30 remains the travel state, based on the vehicle speed signal. Even when the onboard apparatus 10 is provided as the in-vehicle navigation system, it may be possible to determine whether the vehicle 30 remains the travel state, based on the vehicle speed signal. The onboard apparatus 10a may be provided as an event data recorder (also referred to as a drive recorder), for example.

The second refresh process may perform the refresh control when the onboard apparatus 10 is mounted to the vehicle 30 and when the vehicle 30 enters a predetermined service state. For example, the second refresh process may perform the refresh control based on an ACC-ON signal input to the onboard apparatus 10.

According to the embodiment, the CPU 12 performs a program data stored in the storage device 13 to perform the first refresh process and the second refresh process. Instead, the controller 132 may perform the first refresh process and the second refresh process.

In the refresh control, the controller 132 performs the error detection and the error correction on data to be read by the CPU 12 from the storage portion 131. This may be changed. For example, the CPU 12 may read data from the storage portion 131 to the RAM 14. The CPU 12 may then perform the error detection and the error correction on the data read to the RAM 14.

According to the embodiment, the storage device 13 is provided as a BGA package. This may be changed. For example, the storage device 13 may be provided as a SOP (small outline package). The storage device 13 just needs to be soldered to the circuit board 11.

The embodiment uses e•MMC for the storage device 13. Instead, the embodiment may use a storage device (for example, SmartNAND, registered trademark) including other NAND-type flash memory as a storage portion. According to the embodiment, the storage device 13 includes the storage portion 131 and the controller 132. This may be changed to use a storage device that includes only a storage portion.

According to the embodiment, the refresh control reads data stored in the storage portion 131 and sequentially writes back the data. This may be changed. The refresh control may once read all data stored in the storage portion 131 to the RAM 14 and then write all the read data from the RAM 14 back to the storage portion 131 at a time.

The data-refresh apparatus according to an example of the disclosure performs refresh control on a storage device that includes the NAND-type flash memory and is included in an onboard apparatus. The refresh control is equated with error detection of all data stored in the flash memory and correction of the detected error. The storage device is soldered to a circuit board after data is written during a manufacturing process. The data-refresh apparatus includes a first refresh portion and a second refresh portion. The first refresh portion performs the refresh control when a predetermined period elapses. The second refresh portion performs the refresh control when the onboard apparatus is installed to a vehicle and the vehicle subsequently enters the predetermined service state.

An error may occur in the NAND-type flash memory since the error rate increases over time or since the error rate increases after soldering the storage device to the circuit board. The first refresh portion performs the refresh control to restrain an increase in the error rate over time. The second refresh portion performs the refresh control to restrain an increase in the error rate due to soldering the NAND-type flash memory.

It is supposed that the vehicle enables to provide service after the onboard apparatus is built in the vehicle. In this case, the power supply unit of the vehicle can be assumed to start continuously supplying the power to the onboard apparatus. When the vehicle is serviceable, this easily enables to ensure the time, or even a long time, required for the refresh control that detects and corrects an error on all data stored in the NAND-type flash memory. The refresh control by the second refresh portion may be available without providing the manufacturing process with a special working process for the refresh control. In this case, the refresh control after soldering the storage device to the circuit board may be performed after the vehicle starts to be in service. It may be possible to prevent the refresh control from prolonging the manufacturing process. It may be possible to favorably perform the refresh control while restraining the manufacturing process of the onboard apparatus from being prolonged.

While various embodiments, configurations, and aspects of the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects according to the present disclosure.

What is claimed is:

1. A data-refresh apparatus that performs a refresh control on a storage device being included in an onboard apparatus and including a NAND-type flash memory, the refresh control detecting an error of all data stored in the flash memory and correcting a detected error, the data-refresh apparatus comprising:
   a first refresh portion that performs the refresh control when a predetermined period elapses; and a second refresh portion that performs the refresh control when the onboard apparatus is installed to a vehicle and the vehicle subsequently becomes a predetermined service state, wherein:

the storage device is written with data and subsequently soldered to a circuit board in manufacturing of the onboard apparatus;

the second refresh portion includes a travel determination portion that determines whether the vehicle remains a travel state; and the second refresh portion performs the refresh control while assuming that the vehicle becomes the predetermined service state, when the travel determination portion determines that the vehicle remains the travel state.

2. The data-refresh apparatus according to claim 1, wherein:

the second refresh portion starts the refresh control when the onboard apparatus is installed to the vehicle and the vehicle subsequently becomes the predetermined service state; and when the refresh control starts and when an error detection and correction of the detected error is not completed on the all data within a period while power is supplied to the onboard apparatus, the error detection of remaining data of the all data and the correction of the detected error are performed when the power is supplied to the onboard apparatus next time.

3. The data-refresh apparatus according to claim 1, wherein:

the onboard apparatus is provided by an in-vehicle navigation system; and the travel determination portion determines whether the vehicle remains the travel state, based on a position of the vehicle calculated by the in-vehicle navigation system.

4. The data-refresh apparatus according to claim 1, wherein:

the travel determination portion determines whether the vehicle remains the travel state, based on a vehicle speed signal inputted to the onboard apparatus and indicates that the vehicle remains the travel state.

* * * * *